United States Patent
Das et al.

(10) Patent No.: US 10,536,380 B2
(45) Date of Patent: Jan. 14, 2020

(54) METHOD AND SYSTEM FOR INTELLIGENT LINK LOAD BALANCING

(71) Applicant: WIPRO LIMITED, Bangalore (IN)

(72) Inventors: Rishav Das, Howrah (IN); Karanjit Singh, Tarn-Taran (IN); Maulik Yagnik, Bangalore (IN)

(73) Assignee: Wipro Limited, Bangalore (IN)

(*) Notice: Subject to any disclaimer, the term of this patent is extended or adjusted under 35 U.S.C. 154(b) by 0 days.

(21) Appl. No.: 15/922,992

(22) Filed: Mar. 16, 2018

(65) Prior Publication Data

US 2019/0238465 A1    Aug. 1, 2019

(30) Foreign Application Priority Data

Jan. 26, 2018   (IN) .............................. 201841003126

(51) Int. Cl.
*H04L 12/803* (2013.01)
*H04L 12/24* (2006.01)
*H04L 12/26* (2006.01)

(52) U.S. Cl.
CPC .......... *H04L 47/125* (2013.01); *H04L 41/147* (2013.01); *H04L 43/0876* (2013.01)

(58) Field of Classification Search
CPC .. H04L 47/125; H04L 41/147; H04L 43/0876
See application file for complete search history.

(56) References Cited

U.S. PATENT DOCUMENTS

| | | | | |
|---|---|---|---|---|
| 9,894,578 | B1* | 2/2018 | Jawaharlal | H04W 36/14 |
| 2012/0131591 | A1* | 5/2012 | Moorthi | G06Q 10/06 |
| | | | | 718/104 |
| 2015/0242801 | A1* | 8/2015 | Cudak | G06Q 10/063116 |
| | | | | 705/7.19 |
| 2016/0254955 | A1* | 9/2016 | Labrou | H04L 41/0816 |
| | | | | 709/221 |
| 2018/0137412 | A1* | 5/2018 | Nikkhah | G06N 3/08 |
| 2018/0219955 | A1* | 8/2018 | Chen | H04L 67/148 |
| 2019/0098067 | A1* | 3/2019 | Sandoval | H04L 65/80 |

FOREIGN PATENT DOCUMENTS

| | | |
|---|---|---|
| CN | 103401800 | 11/2013 |
| CN | 104753807 | 7/2015 |
| CN | 104994029 | 10/2015 |

* cited by examiner

*Primary Examiner* — Hassan Kizou
*Assistant Examiner* — Deepa Belur
(74) *Attorney, Agent, or Firm* — Finnegan, Henderson, Farabow, Garrett & Dunner, LLP (57) ABSTRACT

This disclosure relates to method and system for intelligent link load balancing. In one embodiment, a method for performing intelligent link load balancing in a computer network including a number of network service providers (NSPs) is disclosed. The method includes monitoring ongoing network traffic transaction data of the computer network, predicting a current network latency level for the ongoing network traffic transaction data for each of the NSPs based on a relationship between a network latency level and network traffic transaction data for each of the NSPs, determining an optimal NSP to route ongoing network traffic based on an analysis of the current network latency level of each of the NSPs, and effecting routing of the ongoing network traffic through the optimal NSP. The relationship is learnt based on an analysis of historical network latency level and historical network traffic transaction data for each of the NSPs.

18 Claims, 6 Drawing Sheets

METHOD AND SYSTEM FOR INTELLIGENT LINK LOAD BALANCING

TECHNICAL FIELD

This disclosure relates generally to computer networks, and more particularly to method and system for intelligent link load balancing.

BACKGROUND

Computer networking has become an integral part of conducting business in today's world. It may be vital that a computer network operate efficiently so as to truly harness its benefits. Typically, a large computer network includes a number of network links from a plurality of network service providers (NSPs). A link load balancer is a network appliance that distributes inbound and outbound network traffic to and from multiple NSP links in the computer network. Thus, the link load balancer may help in providing failover and bandwidth management for a plurality of connections in a wide area network (WAN) to assure continuous operation of enterprise applications and cloud services in the event that one or more NSP links become unavailable or slow to respond.

As will be appreciated, there are many existing techniques in which the inbound and outbound network traffic to and from the computer network to the NSP may be routed so as to maximize usage of all the NSP links. For example, the link load balancer may employ a number of traffic management methods to ensure the seamless performance of multiple NSP links to their maximum benefit. In most of the scenarios, the network administrator may set policies for the link load balancer so that when it receives a request, it takes into account factors, such as, client and end-user round-trip times and the availability of bandwidth for each NSP link, before completing the request. In another scenario, the link load balancer may employ threshold based pre-defined method to achieve load balancing. However, many a times, such techniques fail to predict the upcoming load in the NSP, thereby resulting into unequal distribution of load and less efficient link load balancer.

In yet another scenario, a proximity detection may be employed for performing link load balancing. The technique detects proximity of physical links by sending probe packets from all the physical links after receiving the packets, and then performs load balancing based on detected proximity. However, this technique is not intelligent enough to analyze the rates of the speed, incoming and outgoing packet losses, high traffic on one of the routes, and so forth. Thus, many NSP links may be unutilized under this technique.

SUMMARY

In one embodiment, a method for performing intelligent link load balancing in a computer network comprising a plurality of network service providers (NSPs) is disclosed. In one example, the method may include monitoring ongoing network traffic transaction data of the computer network. The method may further include predicting a current network latency level for the ongoing network traffic transaction data for each of the plurality of NSPs based on a relationship between a network latency level and network traffic transaction data for each of the plurality of NSPs. The method may further include determining an optimal NSP to route ongoing network traffic based on an analysis of the current network latency level of each of the plurality of NSPs. The method may further include effecting routing of the ongoing network traffic through the optimal NSP. The relationship is learnt based on an analysis of historical network latency level and historical network traffic transaction data for each of the plurality of NSPs.

In one embodiment, a system for performing intelligent link load balancing in a computer network comprising a plurality of network service providers (NSPs) is disclosed. In one example, the system may include at least one processor and a memory communicatively coupled to the at least one processor. The memory may store processor-executable instructions, which, on execution, may cause the processor to monitor ongoing network traffic transaction data of the computer network. The processor-executable instructions, on execution, may further cause the processor to predict a current network latency level for the ongoing network traffic transaction data for each of the plurality of NSPs based on a relationship between a network latency level and network traffic transaction data for each of the plurality of NSPs. The processor-executable instructions, on execution, may further cause the processor to determine an optimal NSP to route ongoing network traffic based on an analysis of the current network latency level of each of the plurality of NSPs. The processor-executable instructions, on execution, may further cause the processor to effect routing of the ongoing network traffic through the optimal NSP. The relationship is learnt based on an analysis of historical network latency level and historical network traffic transaction data for each of the plurality of NSPs.

In one embodiment, a non-transitory computer-readable medium storing computer-executable instructions for performing intelligent link load balancing in a computer network comprising a plurality of network service providers (NSPs) is disclosed. In one example, the stored instructions, when executed by a processor, may cause the processor to perform operations including monitoring ongoing network traffic transaction data of the computer network. The operations may further include predicting a current network latency level for the ongoing network traffic transaction data for each of the plurality of NSPs based on a relationship between a network latency level and network traffic transaction data for each of the plurality of NSPs. The operations may further include determining an optimal NSP to route ongoing network traffic based on an analysis of the current network latency level of each of the plurality of NSPs. The operations may further include effecting routing of the ongoing network traffic through the optimal NSP. The relationship is learnt based on an analysis of historical network latency level and historical network traffic transaction data for each of the plurality of NSPs.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
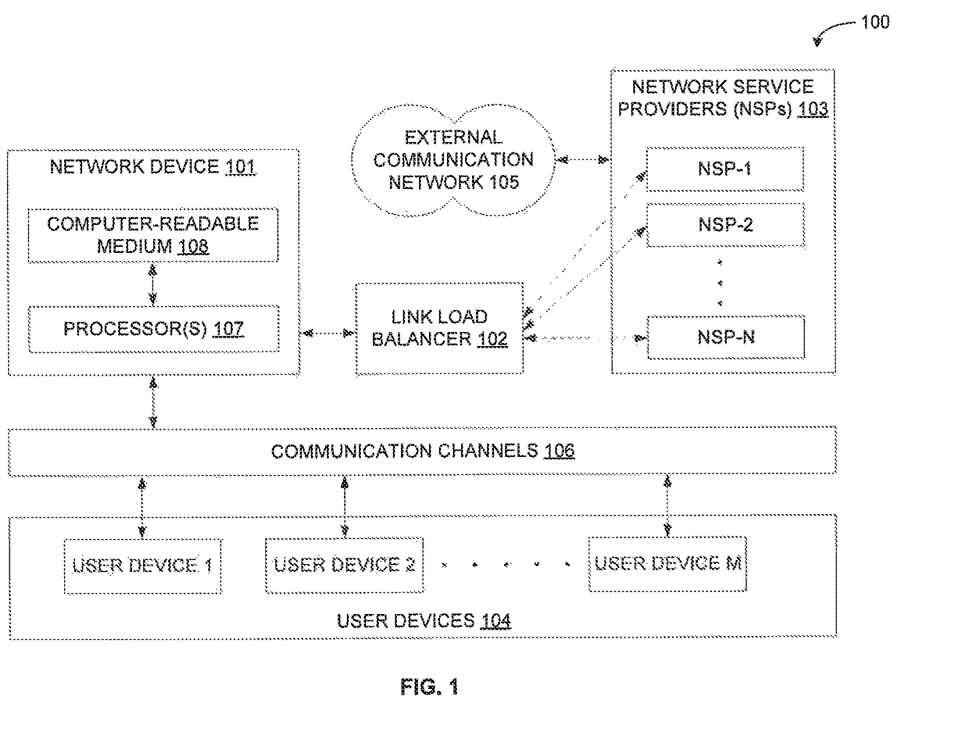
FIG. 1 is a block diagram of an exemplary system for performing intelligent link load balancing in a computer network in accordance with some embodiments of the present disclosure.

Referring now to FIG. 1, an exemplary system 100 for performing intelligent link load balancing in a computer network is illustrated in accordance with some embodiments of the present disclosure. In particular, the system 100 may include a network device 101, a link load balancer 102, and a number of network service providers (NSPs) 103 (NSP-1, NSP-2 . . . NSP-N). It should be noted that the network device 101, the link load balancer 102, and each of the NSPs 103 may be in communication among each other directly or through an intermediary device(s). Further, the system 100 may include a number of user devices 104 (user device 1, user device 2 . . . user device M) adapted to access an external network 105 over a wired or a wireless communication channel(s) 106 through the network device 101, the link load balancer 102, and the NSPs 103. It should be noted that a user device 104 may receive a service request to connect to the external network 105 from a corresponding user. The user device 104 may then connect to one of the NSPs 103 via the network device 101 and the link load balancer 102 to execute the service request. The network device 101 in conjunction with the link load balancer 102 may direct the service request to an appropriate NSP 103 for servicing the service request. As will be appreciated by those skilled in the art, each of the components 101-104 of the system 100 may be a processor based computing device capable of being part of the computer network (i.e., a cloud platform). The processor based computing device may include, but is not limited to, a computer, a laptop, a personal computing device (e.g., a tablet computer, a smartphone, etc.), a server, a router, and so forth.

Additionally, the network device 101 either by itself or in conjunction with one or more of the link load balancer 102, and the NSPs 103 may implement an intelligent link load balancing engine for performing intelligent link load balancing in the computer network in accordance with some embodiments of the present disclosure. As will be described in greater detail in conjunction with FIG. 2, the intelligent link load balancing engine may monitor ongoing network traffic transaction data of the computer network, predict a current network latency level for the ongoing network traffic transaction data for each of the NSPs based on a relationship between a network latency level and network traffic transaction data for each of the NSPs, determine an optimal NSP to route ongoing network traffic based on an analysis of the current network latency level of each of the NSPs, and effect routing of the ongoing network traffic through the optimal NSP. The relationship may be learnt based on an analysis of historical network latency level and historical network traffic transaction data for each of the NSPs.

Thus, the network device 101 may learn the relationship between a network latency level and network traffic transaction data for each of the NSPs. The network device 101 may then utilize the learnt relationship to predict a current network latency level for the ongoing network traffic transaction data for each of the NSPs. The network device 101 may then determine an optimal NSP to route ongoing network traffic based on an analysis of the current network latency level of each of the NSPs, and effect routing of the ongoing network traffic through the optimal NSP.

The network device 101 may include one or more processors 107 and a computer-readable medium (e.g., a memory) 108. The computer-readable medium 108 may store instructions that, when executed by the one or more processors 107, cause the one or more processors 107 to perform intelligent link load balancing in accordance with aspects of the present disclosure. The computer-readable storage medium 108 may also store various data (e.g., ongoing network traffic transaction data, historical network traffic transaction data, training data, learnt relationship, optimal NSP, etc.) that may be captured, processed, and/or required by the network device 101 or by the system 100. The one or more processors 108 may perform data processing functions so as to learn relationships, predict current network latency levels, determine an optimal NSP, effect routing of the network traffic, and so forth.

As will be appreciated, in some embodiments, the network device 101 may be located locally with respect to the link load balancer 102, or the NSPs 103. For example, in some embodiments, the network device 101 may be a separate device in communication with the link load balancer 102, which in turn is in communication with the NSPs 103. Alternatively, in some embodiments, the network device 101 may be embedded within the link load balancer 102. Additionally, in some embodiments, the network device 101 and the link load balancer 102 may all be part of one or more of the NSPs 103. Further, as will be appreciated, in some embodiments, the network device 101 may be located remotely with respect to the link load balancer 102, or the NSPs 103. For example, in some embodiments, the network device 101 may be located in a remote server of a service provider. Further, as will be appreciated, in some embodiments, various components of the network device 101 may be physically located together in one device. Alternatively, in some embodiments, the components of the network device 101 may be physically distributed across various devices. For example, the processor 107 and the computer readable medium 108 may be physically located together in one device or may be physically distributed across various devices.

Figure 2:
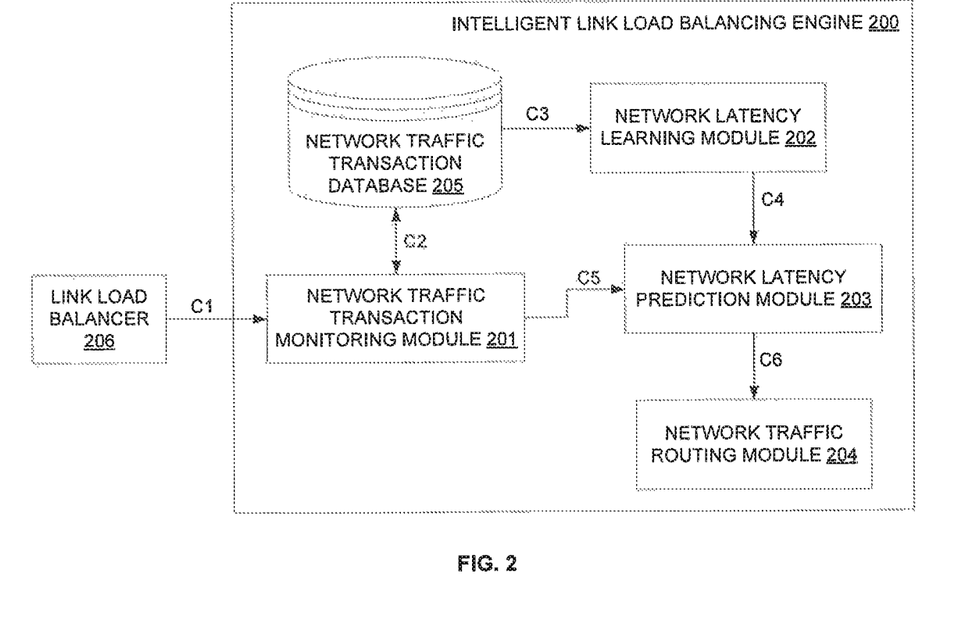
FIG. 2 is a functional block diagram of an intelligent link load balancing engine in accordance with some embodiments of the present disclosure.

Referring now to FIG. 2, a functional block diagram of the intelligent link load balancing engine 200, implemented by the network device 101 of the system 100 of FIG. 1, is illustrated in accordance with some embodiments of the present disclosure. The intelligent link load balancing engine 200 may include various modules that perform various functions so as to perform intelligent link load balancing in a computer network. In some embodiments, the intelligent link load balancing engine 200 may include a network traffic transaction monitoring module 201, a network latency learning module 202, a network latency prediction module 203, a network traffic routing module 204, and a network traffic transaction database 205. As will be appreciated by those skilled in the art, all such aforementioned modules 201-204 and the database 205 may be represented as a single module or a combination of different modules. Moreover, as will be appreciated by those skilled in the art, each of the modules 201-204 and the database 205 may reside, in whole or in parts, on one device or multiple devices in communication with each other. For example, each of the modules 201-204 and the database 205 may reside, in whole or in parts, on any of the network device 101, the link load balancer 102, and/or the NSPs 103.

The network traffic transaction monitoring module 201 may monitor and acquire ongoing inbound and outbound network traffic transaction data from NSPs of a computer network through a link load balancer 206 (analogous to the link load balancer 102 implemented by the system 100 of FIG. 1) via a connection C1. The network traffic transaction data may include, but may not be limited to, packets transported, bandwidth available, packets dropped, packet drop time and queuing delay for each of the NSPs. The network traffic transaction monitoring module 201 may further store the ongoing network traffic transaction data in the network traffic transaction database 205. In particular, the network traffic transaction database 205 may receive the ongoing inbound and outbound network traffic transaction data from the network traffic transaction monitoring module 201 via a connection C2, and store the same for subsequent processing and analysis. In some embodiment, the network traffic transaction database 205 may directly receive and locally store network traffic transaction data that may be stored in the link load balancer 206 of the computer network.

As will be appreciated, the network traffic transaction database 205 may also have historical network traffic transaction data from the NSPs (i.e., past network traffic transaction data stored by the network traffic transaction monitoring module 201). It should be noted that, in some embodiments, the historical network traffic transaction data may be captured for a pre-defined period based on a frequency of packet transmission. Additionally, in some embodiments, if the historical network traffic transaction data captured is not sufficient for subsequent analysis (i.e., learning), the pre-defined may be increased to ensure data sufficiency. For example, the historical network traffic transaction data may include network traffic transaction captured for previous 1 minute. However, if sufficient data is not generated in 1 minute, packet transmission data for previous 2 minute data may be captured, and so on.

The network latency learning module 202 may learn the relationship existing between a latency level and the network traffic transaction data (i.e., packets transported, bandwidth available, packets dropped, packet drop time, queuing delay etc.) for each of the NSPs by analyzing training data as well as the captured historical and ongoing network traffic transaction data. The training data may include, but may not be limited to, user created labels on total packet transmitted, bandwidth rates, packets dropped, and rate of packet dropped. It should be noted that the network latency learning module 202 may receive the captured historic and the ongoing inbound and outbound network traffic transaction data from the network traffic transaction database 205 via a connection C3.

The network latency prediction module 203 may predict the latency level for the received ongoing network traffic transaction data (i.e., packets transported, bandwidth available, packets dropped, packet drop time, queuing delay, etc.) for each of the NSPs based on the learnt relationship between the latency level and the network traffic transaction data (i.e., total packets transmitted in the network, bandwidth rates, packet drops, rate of packet drops, etc. for each of the NSPs). It should be noted that the network latency prediction module 203 may receive the learnt relationship from the network latency learning module 202 via a connection C4. Further, it should be noted that the network latency prediction module 203 may receive the ongoing network traffic transaction data from the network traffic transaction monitoring module 201 via a connection C5.

The network traffic routing module 204 may determine an optimal NSP from among the NSPs to route the ongoing network traffic based on an analysis of the current network latency level of each of the NSPs. For example, the network traffic routing module 204 may identify a least utilized NSP to route the ongoing network traffic by analyzing the predicted latency level of each of the NSPs. It should be noted that the network traffic routing module 204 may receive the predicted latency level for each of the NSPs from the network latency prediction module 203 via a connection C6.

As will be appreciated, each of the connections, C1-C6, may acquire or transfer data from one module 201-204 or the database to the other module 201-204 or the database 205 using standard wired or wireless data connections means. For example, each of the connections, C1-C6, may employ one or more connection protocols including, but not limited to, serial advanced technology attachment (SATA), integrated drive electronics (IDE), IEEE-1394, universal serial bus (USB), fiber channel, small computer systems interface (SCSI), STD Bus, RS232, RS-422, RS-485, I2C, SPI, Microwire, 1-Wire, IEEE 1284, Intel® QuickPathInterconnect, InfiniBand, and PCIe.

By way of an example, the intelligent link load balancing engine 200 described above may perform intelligent link load balancing by analyzing all the network traffic transaction data recorded by the link load balancer 206, and determining the optimal route (e.g., minimum utilized route) for a given network traffic. It should be noted that the optimal rote may continue to change based on user workloads and/or applications. In other words, the intelligent link load balancing engine 200 may perform continuous analysis of various network parameters such that the inbuilt intelligence may determine the minimum or the maximum traffic route for each of the NSPs. The intelligent link load balancing engine 200 may then determine the optimal routing route for the ongoing network traffic based on the above analyses.

It should be noted that the intelligent link load balancing engine 200 may be implemented in programmable hardware devices such as programmable gate arrays, programmable array logic, programmable logic devices, and so forth. Alternatively, the intelligent link load balancing engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for performing intelligent link load balancing in a computer network. For example, the exemplary system 100 and the associated intelligent link load balancing engine 200 may perform intelligent link load balancing in a computer network by the processes discussed herein. In particular, as will be appreciated by those of ordinary skill in the art, control logic and/or automated routines for performing the techniques and steps described herein may be implemented by the system 100 and the associated intelligent link load balancing engine 200, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3:
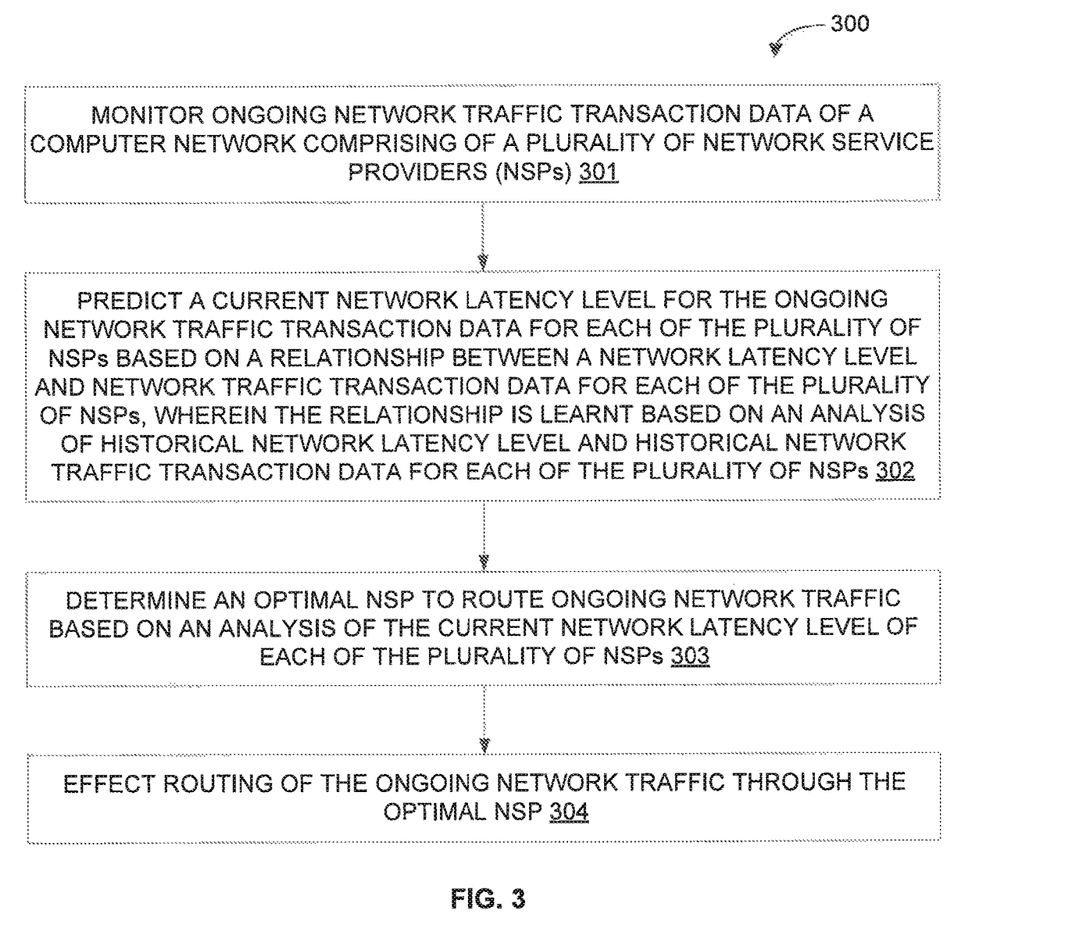
FIG. 3 is a flow diagram of an exemplary process for performing intelligent link load balancing in a computer network in accordance with some embodiments of the present disclosure.

For example, referring now to FIG. 3, exemplary control logic 300 for performing intelligent link load balancing in a computer network via a system, such as system 100, is depicted via a flowchart in accordance with some embodiments of the present disclosure. As illustrated in the flowchart, the control logic 300 may include the steps of monitoring ongoing network traffic transaction data of the computer network at step 301, predicting a current network latency level for the ongoing network traffic transaction data for each of the plurality of NSPs based on a relationship between a network latency level and network traffic transaction data for each of the plurality of NSPs at step 302, determining an optimal NSP to route ongoing network traffic based on an analysis of the current network latency level of each of the plurality of NSPs at step 303, and effecting routing of the ongoing network traffic through the optimal NSP at step 304. The relationship may be learnt based on an analysis of historical network latency level and historical network traffic transaction data for each of the plurality of NSPs. In some embodiments, the control logic 300 may further include the step of learning the relationship between the network latency level and the network traffic transaction data for each of the plurality of NSPs using a machine learning process.

In some embodiments, monitoring the ongoing network traffic transaction data at step 301 may further include the steps of acquiring, via the network device, the ongoing network traffic transaction data from the plurality of NSPs, and storing, via the network device, the ongoing network traffic transaction data in a network traffic transaction database. Additionally, in some embodiments, the network traffic transaction database may further store the historical network traffic transaction data. As stated above, in some embodiments, the network traffic transaction data or the ongoing network traffic transaction data may include at least one of a number of packets transported, an available bandwidth, a number of packets dropped, a packet drop time, or a queuing delay.

In some embodiments, the relationship may be further learnt based on an analysis of training data. The training data may include one or more pre-defined labels, or one or more user-defined labels on the historical network latency level or the historical network traffic transaction data for each of the NSPs. Again, as stated above, in some embodiments, the training data may include one or more pre-defined labels, or one or more user-defined labels on at least one of a total number of packets transmitted, a rate of bandwidth, a total number of packets dropped, or a rate of packet dropped.

In some embodiments, determining the optimal NSP at step 303 may further include determining, for each of the plurality of NSPs, at least one of a utilization level, a reliability, a load level, or a total number of packets transported in a given bandwidth. Additionally, in some embodiments, the optimal NSP may be at least one of a least utilized NSP, or a most reliable NSP.

Figure 4:
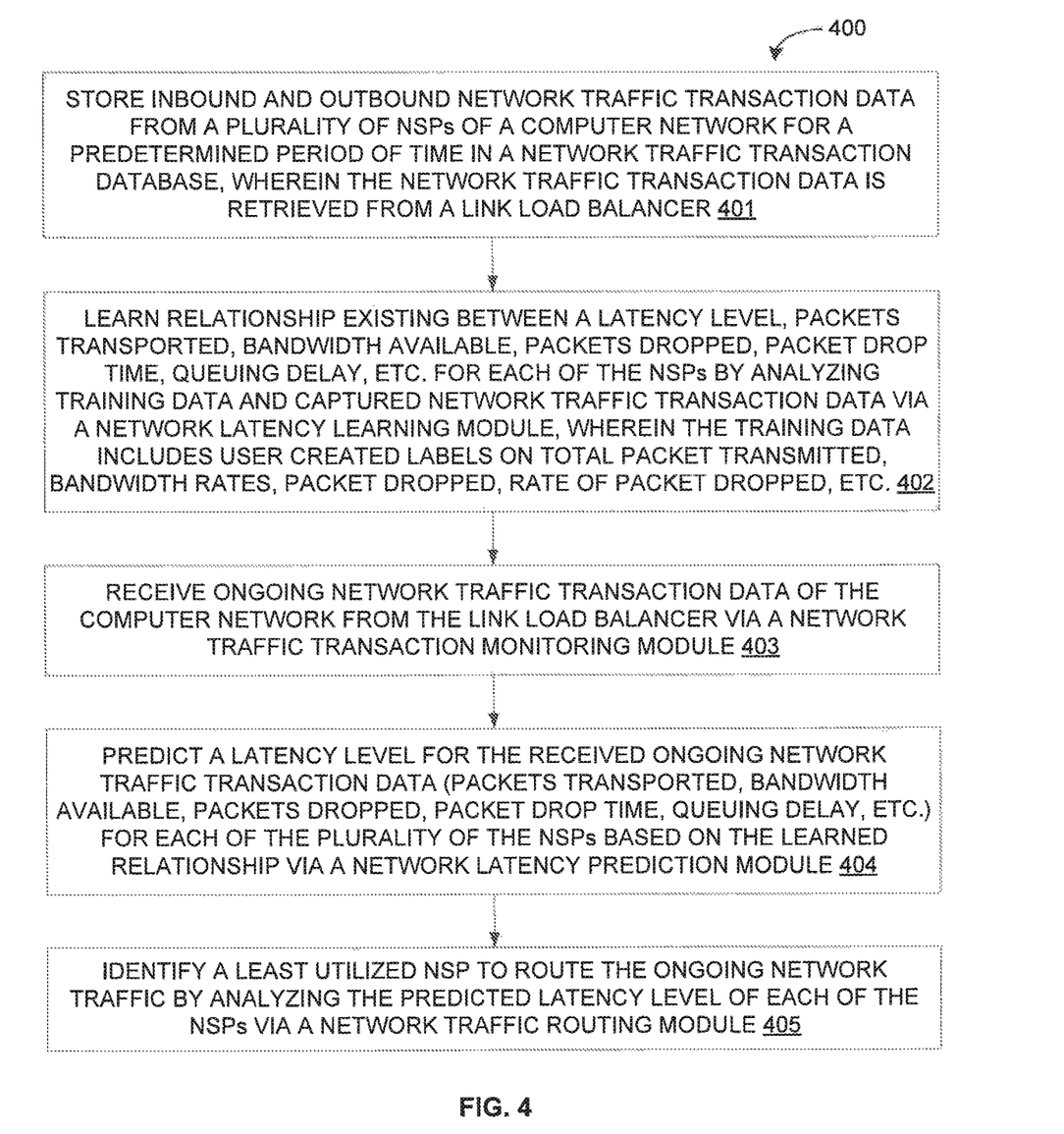
FIG. 4 is a flow diagram of a detailed exemplary process for performing intelligent link load balancing in a computer network in accordance with some embodiments of the present disclosure.

Referring now to FIG. 4, exemplary control logic 400 for performing intelligent link load balancing in a computer network comprising a number of NSPs is depicted in greater detail via a flowchart in accordance with some embodiments of the present disclosure. As illustrated in the flowchart, at step 401, the control logic 400 may store the inbound and outbound network traffic transaction data from the NSPs of the computer network for a predetermined period of time in the network traffic transaction database 205. The network traffic transaction data may be retrieved from the link load balancer 206 by the network traffic transaction monitoring module 201. The network traffic transaction data may include, but may not be limited to, packets transported, packets dropped, bandwidth available, packet drop time, and queuing delay for each of the NSPs.

Further, at step 402, the control logic 400 may learn the relationship between a latency level and the network traffic transaction data (i.e., packets transported, bandwidth available, packets dropped, packet drop time, queuing delay, etc.) for each of the NSPs by analyzing training data and the historically captured network traffic transaction data by means of the network latency learning module 202. The training data may include, but may not be limited to, user created labels on total packet transmitted, bandwidth rates, packet dropped, and rate of packet dropped. It should be noted that the user created labels may either be pre-defined labels in the engine 200 or may be user-defined during operation of the engine 200. Additionally, it should be noted that, in some embodiments, the network latency learning module 202 may employ a machine learning algorithm to learn the relationship (i.e., to build the prediction model). The learnt relationship (i.e., the prediction model) between the latency level and total packet transmitted in the network, bandwidth rates, packet drops, and rate of packet drops for each NSPs may then be provided to the network latency prediction module 203.

Further, at step 403, the control logic 400 may receive the ongoing network traffic transaction data of the computer network from the link load balancer 206 via the network traffic transaction monitoring module 201. The received ongoing network traffic transaction data may then be provided to the network latency prediction module 203. Further, at step 404, the control logic 400 may predict the latency level for the received ongoing network traffic transaction data (e.g., packets transported, bandwidth available, packets dropped, packet drop time, queuing delay, etc.) for each of the NSPs based on the learnt relationship (i.e., the prediction model) by means of the network latency prediction module 203. Moreover, at step 405, the control logic 400 may identify a least utilized NSP from among the NSPs to route the ongoing network traffic by analyzing the predicted latency level of each of the NSPs by means of network traffic routing module 204. The network traffic routing module 204 may receive the predicted packet drop level and packet queue value from the network latency prediction module 203.

Figure 5:
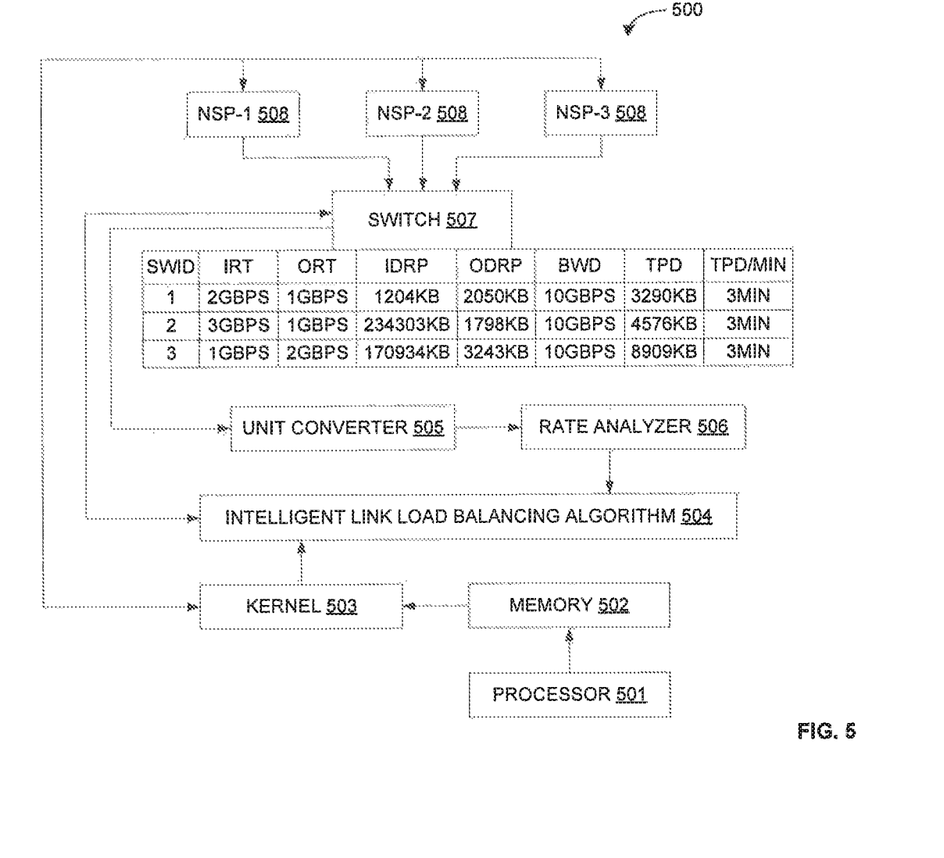
FIG. 5 is a block diagram of an exemplary implementation architecture of an intelligent link load balancing engine in accordance with some embodiments of the present disclosure.

Referring now to FIG. 5, an exemplary implementation architecture of the intelligent link load balancing engine 500 is illustrated in accordance with some embodiments of the present disclosure. The implemented architecture illustrates a processor 501, a memory 502, a kernel 503, an intelligent link load balancing algorithm 504, a unit converter 505, a rate analyzer 506, a switch 507, and a number of NSPs 508.

The unit converter 505 may standardize the network traffic transaction data acquired from various NSPs 508. For example, the unit converter 505 may convert unit of packet size from Bit, Byte, Kilo Byte, and Mega Byte into Giga Byte. Further, as per the intelligent link load balancing algorithm 504 all the transformation of the network speed are in Gbps. Thus, the unit converter 505 may convert network speed related parameters received from the link load balancer's kernel 503 to Gbps for subsequent analysis. The rate analyzer 506 may evaluate the rates of various network parameters after standardization is performed by the unit converter 505. In some embodiments, the rate analyzer may perform regression (e.g., linear regression, multi-regression, etc.) and other statistical analysis so as to evaluate the rates of various network parameters. The switch 507 may be a small amount of memory which enables the intelligent link load balancing algorithm 504 to configure details of the NSP service parameter into internal database.

The NSPs 508 and the link load balancer may be communicatively connected together with optic fiber channel. The data packets keep transporting as per business requirement for enterprise levels and as per user requirement for small scale need. The link load balancer kernel 503 may continuously monitor the network parameters of the data traffic getting transported from the NSPs 508 to the link load balancer. Thus, all the data which are monitored may be provided to the internal database of the intelligent link load balancing engine 500.

The intelligent link load balancing engine 500 may manipulate all monitored data and use the intelligence so derived to find out the optimal NSP routes for transferring the ongoing network traffic. As stated above, all the data monitored by the kernel 503 may be standardized in terms of Gbps by the unit converter 505 and then provided to the rate analyzer 506. The rate analyzer 506 may then provide the data along with the evaluated rates when requested by the intelligent link load balancing algorithm 504 while deriving intelligence. In some embodiments, the intelligent link load balancing algorithm 504 may calculate total packets transported in a given bandwidth, and may check whether it is reaching to its extreme utilization. It should be noted that the intelligent link load balancing algorithm 504 may perform such calculations for all the NSPs which may be configured with the link load balancer.

Further, the intelligent link load balancing algorithm 504 may check the total number of packet lost (incoming/outgoing), and analyze the time required to re-transmit the datagram to its destination without error. The information on required time may be further utilized to determine the traffic concentration for particular NSP. Once the total packets has been determined, they may be analyzed, against current instance, for high bandwidth capacity and for low traffic handling. Thus, the network traffic with highest number of packets transportation may get routed to less traffic and high bandwidth NSP. As will be appreciated, such dynamic balancing may keep continuing, thereby helping the link load balancer to reduce the network traffic congestion and utilize the resource more efficiently.

As discussed above, the artificial learning based intelligent link load balancing algorithm 504 may divide the network traffic transaction data into two sets: training set, and testing set. The model keeps on training using the training dataset and then validates its training against test dataset. Once the intelligent link load balancing engine determines that the prediction model is appropriate, the intelligent link load balancing engine may proceed with prediction of unknown values. In some embodiments, the intelligent link load balancing engine may receive new datasets and keep all the new dataset in holdout data platform array. Later, when the intelligent link load balancing engine again proceed with the training period, the holdout data platform may be employed for new and further training. This process may keep on repeating till the prediction model is robust enough and is able to predict the latency level of a NSP with a certain pre-defined degree of confidence. When no new dataset comes to the holdout data platform array, the intelligent link load balancing engine may use n-fold cross validation techniques for subsequent training and testing.

In short, the present disclosure utilizes artificial intelligence to analyze the network traffic, analyze bandwidth rates, and analyze packet drops from NSP to the link load balancer, and then use artificial intelligence based prediction model to identify the best NSP link that may forward the network traffic.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
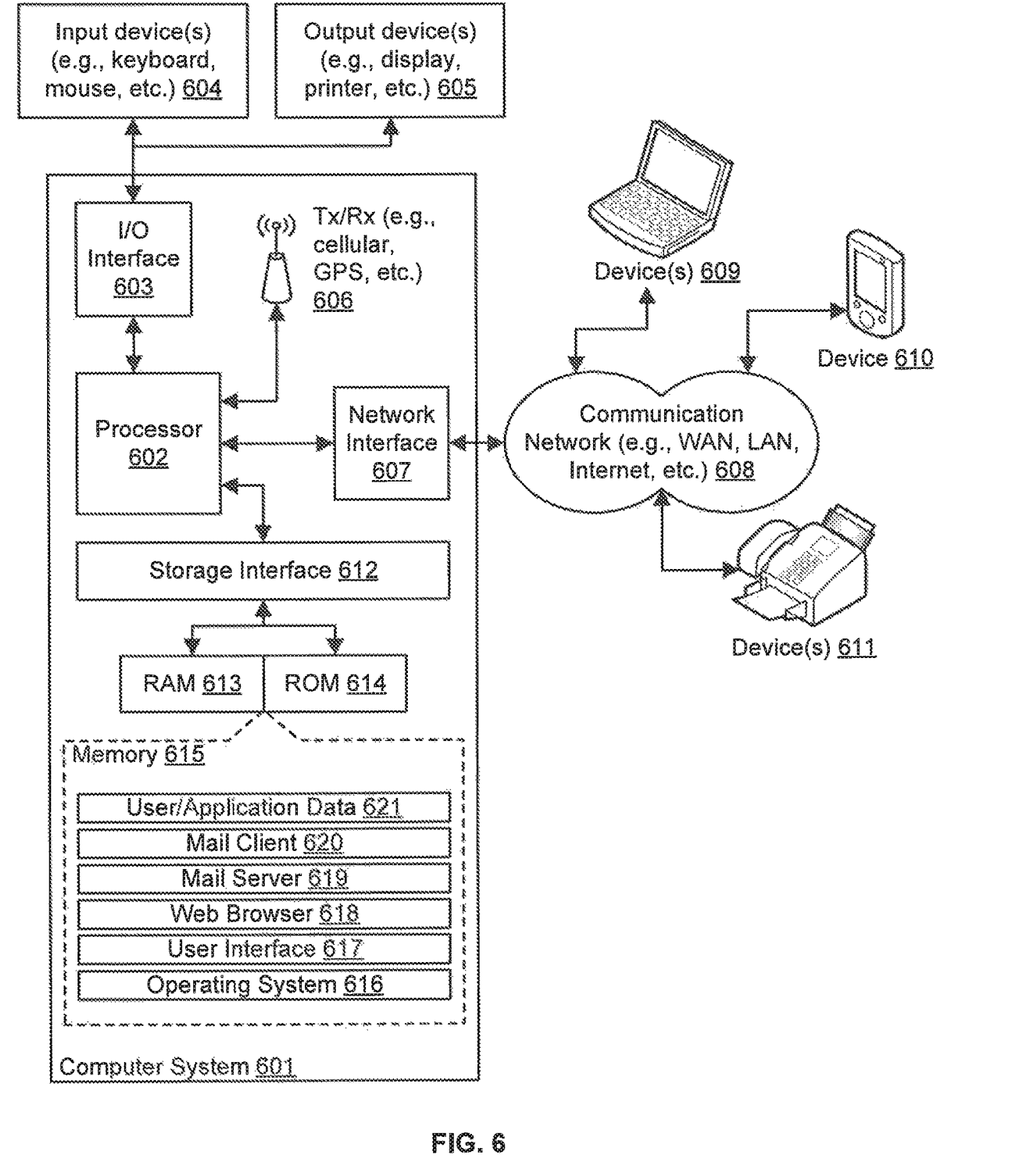
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 100 for performing intelligent link load balancing in a computer network. Computer system 601 may include a central processing unit ("CPU" or "processor") 602. Processor 602 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), RF antennas, S-Video, video graphics array (VGA), IEEE 602.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9600, or the like), providing IEEE 602.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 602.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. (e.g., ongoing network traffic transaction data, historical network traffic transaction data, training data, learnt relationship, optimal NSP, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for intelligent and cost effective link load balancing in a computer network with enhanced link balancing capabilities. The techniques employ various intelligent modules to determine the least loaded NSP with better reliability. The inbound and outbound traffic-transaction data from a number of NSPs of the computer networks may be employed for learning the relationship existing between a latency level, packets transported, bandwidth available, packets dropped, packet drop time, queuing delay, and so forth for each of the NSPs. Using the learned relationship, the techniques predict the latency level for the received ongoing traffic-transaction data (packets transported, bandwidth available, packets dropped, packet drop time, queuing delay, etc.) for each of the NSPs. The predicted latency level may be further analyzed to identify the optimal (e.g., least utilized) NSP to route the ongoing traffic. Additionally, the techniques described in the embodiments discussed above provide for reducing the processor cycles in the link load balancer, reducing the packet drop ratio, and determining the time required to reach dropped packet to its destination.

The specification has described method and system for performing intelligent link load balancing in a computer network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of performing intelligent link load balancing in a computer network comprising a plurality of network service providers (NSPs), the method comprising:
    monitoring, by a network device, ongoing network traffic transaction data of the computer network;
    predicting, by the network device, a current network latency level for the ongoing network traffic transaction data for each of the plurality of NSPs based on a relationship between a network latency level and network traffic transaction data for each of the plurality of NSPs, wherein predicting the current network latency level comprises learning the relationship between the network latency level and the network traffic transaction data for each of the plurality of NSPs using a machine learning process, wherein the relationship is learnt based on an analysis of historical network latency level and historical network traffic transaction data for each of the plurality of NSPs;
    determining, by the network device, an optimal NSP to route ongoing network traffic based on an analysis of the current network latency level of each of the plurality of NSPs; and
    effecting, by the network device, routing of the ongoing network traffic through the optimal NSP.

2. The method of claim 1, wherein monitoring the ongoing network traffic transaction data further comprises:
    acquiring, via the network device, the ongoing network traffic transaction data from the plurality of NSPs; and
    storing, via the network device, the ongoing network traffic transaction data in a network traffic transaction database.

3. The method of claim 2, wherein the network traffic transaction database further stores the historical network traffic transaction data.

4. The method of claim 1, wherein the network traffic transaction data or the ongoing network traffic transaction data comprises at least one of a number of packets transported, an available bandwidth, a number of packets dropped, a packet drop time, or a queuing delay.

5. The method of claim 1, wherein the relationship is further learnt based on an analysis of training data, wherein the training data comprises one or more pre-defined labels, or one or more user-defined labels on the historical network latency level or the historical network traffic transaction data for each of the NSPs.

6. The method of claim 5, wherein the training data comprises one or more pre-defined labels, or one or more user-defined labels on at least one of a total number of packets transmitted, a rate of bandwidth, a total number of packets dropped, or a rate of packet dropped.

7. The method of claim 1, wherein determining the optimal NSP further comprises determining, for each of the plurality of NSPs, at least one of a utilization level, a reliability, a load level, or a total number of packets transported in a given bandwidth.

8. The method of claim 7, wherein the optimal NSP is at least one of a least utilized NSP, or a most reliable NSP.

9. A system for performing intelligent link load balancing in a computer network comprising a plurality of network service providers (NSPs), the system comprising:
 a network device comprising at least one processor and a computer-readable medium storing instructions that, when executed by the at least one processor, cause the at least one processor to perform operations comprising:
  monitoring ongoing network traffic transaction data of the computer network;
  predicting a current network latency level for the ongoing network traffic transaction data for each of the plurality of NSPs based on a relationship between a network latency level and network traffic transaction data for each of the plurality of NSPs, wherein predicting the current network latency level comprises learning the relationship between the network latency level and the network traffic transaction data for each of the plurality of NSPs using a machine learning process, wherein the relationship is learnt based on an analysis of historical network latency level and historical network traffic transaction data for each of the plurality of NSPs;
  determining an optimal NSP to route ongoing network traffic based on an analysis of the current network latency level of each of the plurality of NSPs; and
  effecting routing of the ongoing network traffic through the optimal NSP.

10. The system of claim 9, wherein monitoring the ongoing network traffic transaction data further comprises:
 acquiring the ongoing network traffic transaction data from the plurality of NSPs; and
 storing the ongoing network traffic transaction data in a network traffic transaction database.

11. The system of claim 9, wherein the network traffic transaction data or the ongoing network traffic transaction data comprises at least one of a number of packets transported, an available bandwidth, a number of packets dropped, a packet drop time, or a queuing delay.

12. The system of claim 9, wherein, the relationship is further learnt based on an analysis of training data, wherein the training data comprises one or more pre-defined labels, or one or more user-defined labels on the historical network latency level or the historical network traffic transaction data for each of the NSPs.

13. The system of claim 12, wherein the training data comprises one or more pre-defined labels, or one or more user-defined labels on at least one of a total number of packets transmitted, a rate of bandwidth, a total number of packets dropped, or a rate of packet dropped.

14. The system of claim 9, wherein determining the optimal NSP further comprises determining, for each of the plurality of NSPs, at least one of a utilization level, a reliability, a load level, or a total number of packets transported in a given bandwidth.

15. A non-transitory computer-readable medium storing computer-executable instructions for:
 monitoring ongoing network traffic transaction data of a computer network comprising a plurality of network service providers (NSPs);
 predicting a current network latency level for the ongoing network traffic transaction data for each of the plurality of NSPs based on a relationship between a network latency level and network traffic transaction data for each of the plurality of NSPs, wherein predicting the current network latency level comprises learning the relationship between the network latency level and the network traffic transaction data for each of the plurality of NSPs using a machine learning process, wherein the relationship is learnt based on an analysis of historical network latency level and historical network traffic transaction data for each of the plurality of NSPs;
 determining an optimal NSP to route ongoing network traffic based on an analysis of the current network latency level of each of the plurality of NSPs; and
 effecting routing of the ongoing network traffic through the optimal NSP.

16. The non-transitory computer-readable medium of claim 15, wherein the network traffic transaction data or the ongoing network traffic transaction data comprises at least one of a number of packets transported, an available bandwidth, a number of packets dropped, a packet drop time, or a queuing delay.

17. The non-transitory computer-readable medium of claim 15, wherein the relationship is further learnt based on an analysis of training data, wherein the training data comprises one or more pre-defined labels, or one or more user-defined labels on the historical network latency level or the historical network traffic transaction data for each of the NSPs.

18. The non-transitory computer-readable medium of claim 15, wherein determining the optimal NSP further comprises determining, for each of the plurality of NSPs, at least one of a utilization level, a reliability, a load level, or a total number of packets transported in a given bandwidth.

* * * * *